United States Patent [19]

Wheatley

[11] Patent Number: 5,487,585
[45] Date of Patent: Jan. 30, 1996

[54] RELEASE FOR FLEXIBLE TONNEAU COVER

[76] Inventor: Donald G. Wheatley, 4451 Ford Rd., Ann Arbor, Mich. 48105

[21] Appl. No.: 304,144

[22] Filed: Sep. 12, 1994

[51] Int. Cl.⁶ .................................................. B60P 7/04
[52] U.S. Cl. ........................................ 296/100; 160/368.1
[58] Field of Search ............................ 296/36, 41, 100, 296/136; 160/327, 368.1, 370.21, 383; 150/166; 248/503

[56] References Cited

U.S. PATENT DOCUMENTS 5,275,458  1/1994  Barben et al. .

*Primary Examiner*—Dean Kramer
*Attorney, Agent, or Firm*—Harness, Dickey & Pierce

[57] ABSTRACT

A vehicle tonneau cover having a flexible fabric cover and a frame attached to the vehicle for mounting the flexible fabric cover in which elongated fasteners for attaching the flexible cover to the frame flanges or the frame flanges are provided with a short end portion having a taper. The taper reduces the distance by which the fastener must be moved relative to the frame to achieve the initial removal of the fastener. Once the distal edge of the fastener is moved passed the terminal edge of the frame flange at the end of the fastener, the remainder of the fastener easily peals from the frame, by lifting the flexible fabric from the rail.

10 Claims, 4 Drawing Sheets

RELEASE FOR FLEXIBLE TONNEAU COVER

BACKGROUND AND SUMMARY OF THE INVENTION

The present invention relates generally to flexible tonneau covers for vehicles and in particular to an improved release for removing a tonneau cover that uses an extruded hook fastener along the edge of the flexible tonneau cover fabric to attach the cover fabric to the vehicle.

Tonneau covers are generally defined as any device which can be used to cover a portion of a vehicle. While tonneau covers are generally used to cover convertible cars, boats and trailers, tonneau covers are most commonly associated with pick-up trucks. Both rigid and flexible tonneau covers are available for covering the cargo box of pick-up trucks. The present invention relates to flexible tonneau covers. Flexible tonneau covers for pick-up trucks typically include a rectangular frame made of extruded aluminum rails which are attached to the pick-up truck at the top of the cargo box. A flexible fabric cover is then attached to the rails to cover the cargo box. The fabric is generally a woven material with a vinyl coating. The term "fabric" is used throughout this specification in the broad sense to mean a flexible sheet material and is not limited to a woven material.

One mechanism used to attach the flexible fabric to the frame is an elongated hook shaped fastener along the edge of the flexible fabric. The hook shaped fastener is wrapped around a flange extending from the frame to mount the fabric. The cover is removed from the frame by lifting the fabric off the frame, beginning at one corner and peeling the fastener from the frame along each edge of the fabric. In some situations, particularly in cold weather, however, it can be difficult to begin the initial removal of the fastener from the frame at the corner of the cover. This difficulty in removing the fastener is caused by fabric shrinkage in the cold temperature and increasing stiffness in the hook shaped fastener. Once an initial portion of the fastener is removed from the frame, the fastener will easily peel along the entire length of the cover.

It is an object of the present invention to provide means for easing the initial removal of the fastener from the frame, while at the same time maintaining a tight fit of the cover fabric on the frame.

The present invention eases the removal of the fastener from the frame by providing a tapered end, to either the fastener or the frame flange, along a short end portion of the frame or fastener. This tapered end portion reduces the distance by which the fastener must be moved, relative to the frame, to achieve the initial fastener removal. Once the distal edge of the fastener is moved past the terminal edge of the frame flange at the end of the fastener, the remainder of the fastener will easily peel from the frame by lifting the fabric from the rail. By providing a taper at the end of the frame rail or the fastener, less relative motion between the fastener and the frame is required to achieve the initial removal of the fastener. With less movement required, less force is needed to accomplish the initial removal.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
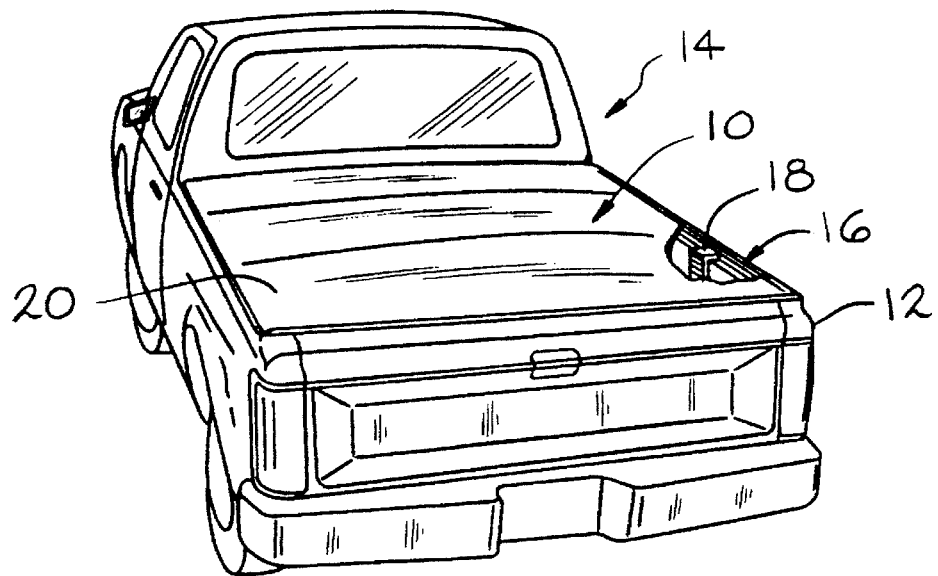
FIG. 1 is a perspective view of a pick-up truck cargo box with the tonneau cover of the present invention installed thereon.
Figure 2:
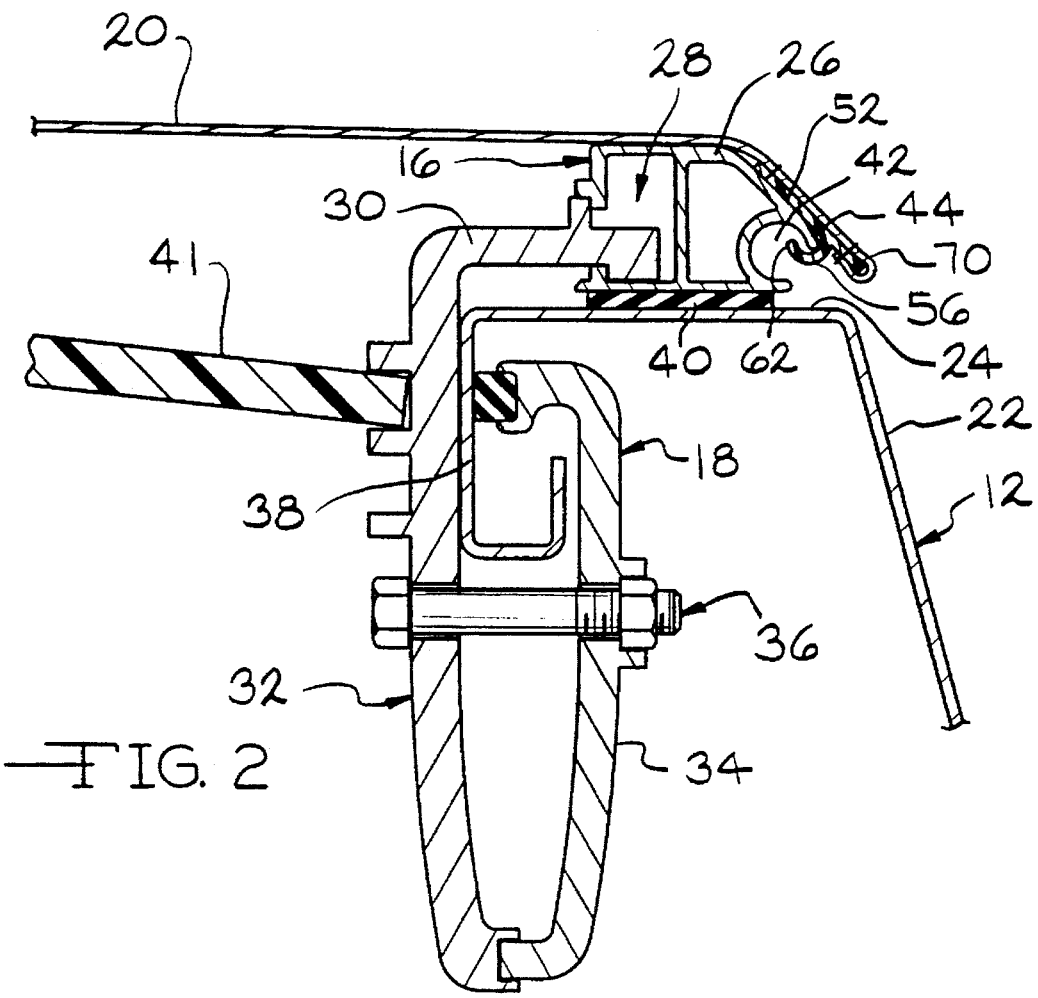
FIG. 2 is a sectional view of the tonneau cover frame and attachment for mounting the tonneau cover to the pick-up truck cargo box.

The tonneau cover 10 of the present invention is shown in FIG. 1 mounted upon the cargo box 12 of a pick-up truck 14. The tonneau cover 10 includes a frame 16, only a portion of which is visible in FIG. 1, which is clamped to the upper end of the cargo box 12 by a plurality of clamps 18. A flexible fabric cover 20 is attached to the frame 16 to cover the cargo box.

A side wall 22 of the cargo box 12 has an upper surface 24 upon which the frame 16 is disposed. The frame 16 is constructed of a plurality of elongated rails 26 which are typically joined together at their ends to form a rectangular frame sized to fit on the cargo box. The rails 26 are typically made of extruded aluminum and are substantially uniform in cross section along the entire lengths. The rails have a slot 28 on the inboard side into which an upper portion 30 of a first clamp member 32 is positioned and is slidable along the length of the rails. A second clamp member 34 is attached to the first clamp member 32 by a nut and bolt assembly 36 and traps a down turned flange 38 of the cargo box sidewall between the clamp members 32, 34. This secures the clamp 18 to the cargo box sidewall and thus secures the tonneau cover frame to the cargo box as well. A foam rubber tape 40 is attached to the bottom of the rail 26, between the rail 26 and the upper surface 24 of the cargo box, to provide a seal between the rail and the cargo box and to prevent scratching of the cargo box finish by the aluminum rail.

The rail 26 includes an outboard slot 42 formed by a flange 44 which extends generally away from the interior of the cargo box 12. The flange 44 has a terminal or distal edge 46. The fabric is attached to the flange 44 by a fastener 50 described below.

The fastener 50 is an elongated extrusion which is attached to the flexible fabric cover 20 along the edge of the fabric. The fastener 50 has a base portion 52 which is generally planar and rests against the inner surface 21 of the fabric 20. The base portion 52 is sewn to the fabric with a pair of seams 54. A hook portion 56 of the fastener is a return bend which extends from the base portion in a direction away from the fabric cover, then turns generally toward the central region of the fabric cover forming a bight 58 with a concave inner surface 60, and terminating in a distal edge 62. The hook portion 56 has a nominal length L from the base portion to the distal edge 62.

The fastener 50 is mounted to the rail 26 by placing the bight 58 of the return bend portion around the terminal edge of the rail flange. This seats the terminal edge into the bight, contacting the concave inner surface 60 along a line of contact which extends the length of the fastener 50 and the rail 26. This line of contact is generally at the deepest point of the concave inner surface of the bight and is spaced from the distal edge 62 of the fastener hook portion 56.

Figure 3:
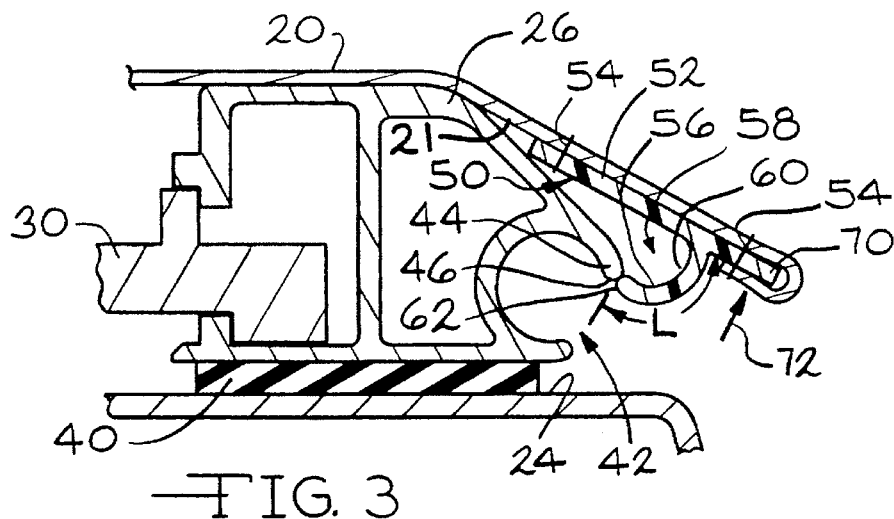
FIG. 3 is an enlarged sectional view of the fastener and frame showing the fastener being removed from the frame.

The base portion of the fastener extends outward, beyond the hook portion, forming a tab 70. The fastener is removed from the rail by applying a force on the tab 70 in the direction of the arrow 72. The force is generally normal to the plane of the fastener base portion 52 and the rail flange 44. This force causes the hook portion 56 to open slightly, allowing the line of contact between the rail flange and the hook portion to move gradually toward the distal edge 62 of the hook portion to the position as shown in FIG. 3. Further movement of the fastener in the direction of the arrow 72 causes the fastener distal edge to clear the rail flange terminal edge, freeing the fastener and cover fabric from the rail. Removal is accomplished by starting at one corner of the tonneau cover and first removing the fastener from the rail at the end of the fastener. After an initial end portion of the fastener is released from the rail, the remainder of the fastener will easily peel away from the rail by lifting of the cover. The greatest force is needed to move the fastener hook portion off the flange at the end of the fastener.

In cold temperatures, the fabric cover 20 shrinks and the fastener 52 stiffens. This increases the force required to initially remove the fastener from the rail. To facilitate removal of the fastener, the hook portion is tapered over a short end portion of the fastener. This taper reduces the length, or wrap, of the hook portion at the end of the fastener. Four embodiments of the taper are shown in FIGS. 4–7.

Figure 6:
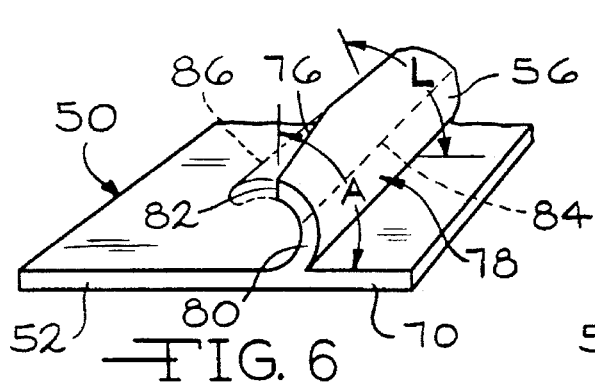
FIG. 6 is a perspective view of another alternative embodiment of the tapered end portion of the fastener.

The invention is best understood in reference to FIG. 6. In FIG. 6, the fastener 50 is shown with a slight taper 76 over a short end portion 78. The taper 76 gradually reduces the length of the hook portion from its nominal length L to a reduced length A. At the end 80, the distal edge 82 of the hook portion is closer to the line 84 formed by the contact of the rail flange with the fastener hook. As a result, less movement of the fastener by pushing on the tab 70 is required before the hook portion distal edge 82 has cleared the terminal edge 46 of the rail flange at the end 80 of the fastener. The taper 76 is formed removing the corner portion of the fastener shown in broken line and designated as 86.

Figure 7:
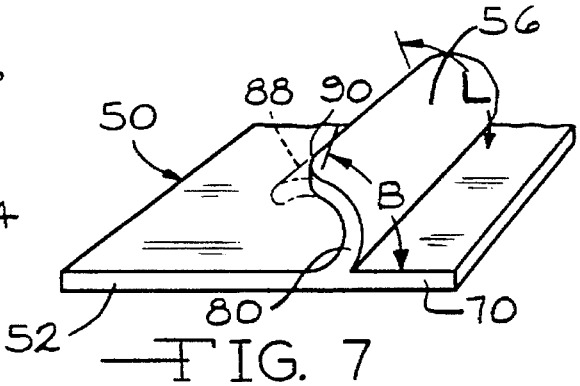
FIG. 7 is a perspective view of still another embodiment of the tapered end portion of the fastener.

With reference to FIG. 7, another embodiment of the present invention is shown in which a corner portion 88 of the fastener is removed, forming a rounded corner 90 at the end 80 of the fastener 50. With the rounded corner 90, the fastener hook portion length is only the length B as opposed to the larger nominal length L which prevails along the remainder of the fastener. Again, the contact line between the rail flange and the fastener hook portion is now closer to the hook portion distal edge at the fastener end 80.

Figure 4:
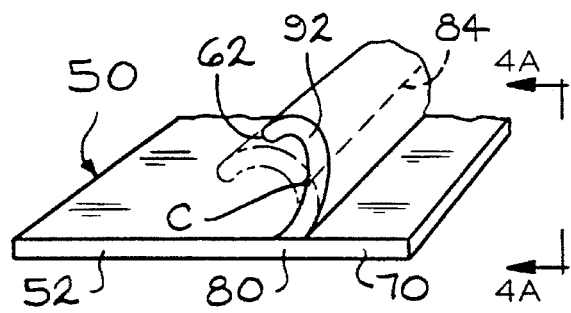
FIG. 4 is a perspective view of a tapered end portion of the fastener.
Figure 4A:
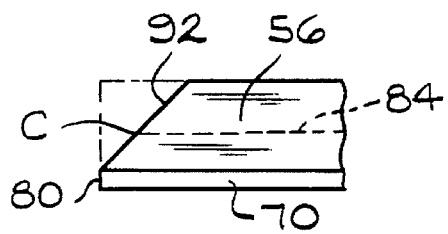
FIG. 4A is a side view of the tapered end portion shown in FIG. 4 as viewed from the line 4A—4A of FIG. 4.

Another embodiment is shown in FIGS. 4 and 4A in which a taper 92 extends from the hook portion distal edge 62 all the way to the base portion 52 at the fastener end 80. As a result, the distal edge of the fastener hook actually crosses the contact line 84 at the point C along the taper 92. The taper 92 is formed along a straight line as shown in FIG. 4A.

Figure 5:
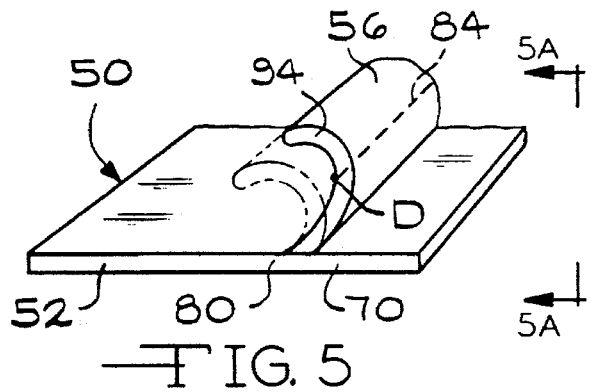
FIG. 5 is a perspective view of another embodiment of the tapered end portion of the fastener.
Figure 5A:
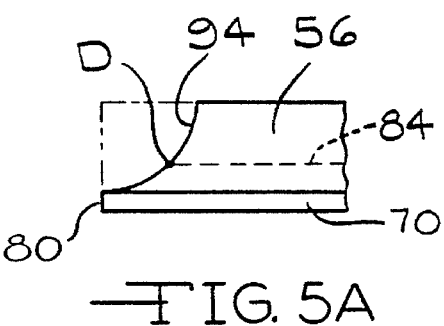
FIG. 5A is a side view of the tapered end portion shown in FIG. 5 as viewed from the line 5A—5A of FIG. 5.

With reference to FIG. 5 and 5A, still another embodiment of the present invention is shown. In this embodiment, a taper 94 is formed along the end portion which is curved, as opposed to the straight taper 92 shown in FIGS. 4 and 4A. The taper curved 94 also extends to the base portion 52 at the fastener end 80 so that the taper crosses the contact line 84 at the point D. The curved taper 94 is formed with a router or other rotary cutter rotating about an axis which is normal to the paper in relation to FIG. 5A.

Figure 8:
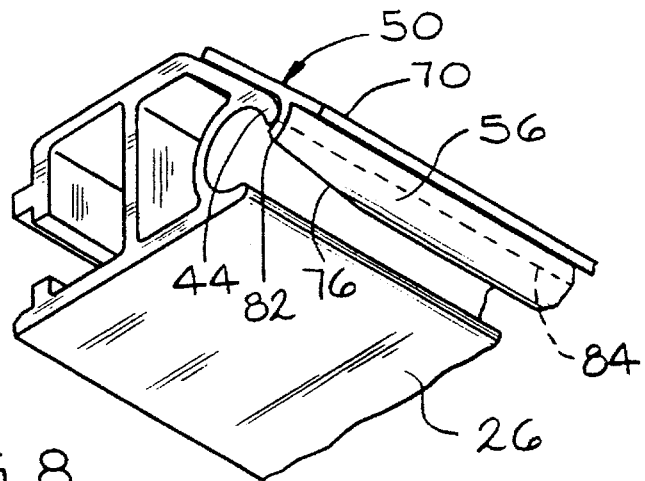
FIGS. 8, 9 and 10 are perspective views illustrating the process of removing the cover from the frame with a fastener having the end taper shown in FIG. 7.
Figure 9:
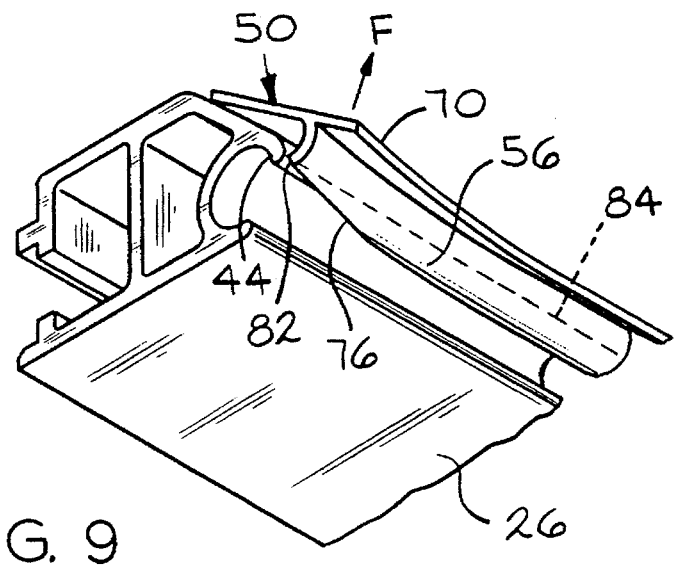
Figure 10:
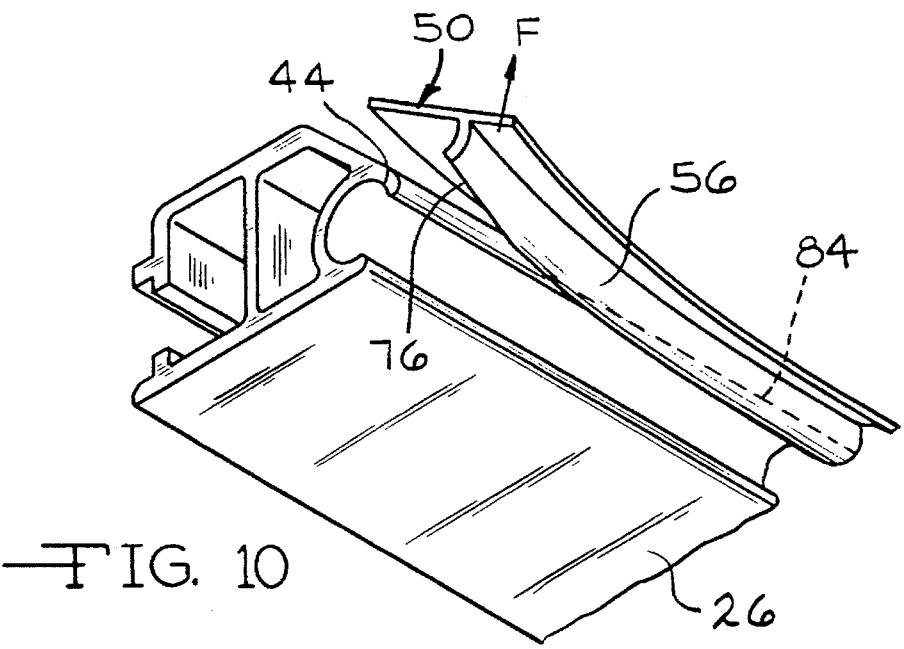

With reference to FIGS. 8, 9 and 10, the progressive removal of the fastener from the rail is shown in sequence. The fastener 50 has a taper 76 like that shown in FIG. 6. As seen in FIG. 8, the line of contact 84 between the rail flange and the fastener hook portion is closer to the distal edge 82 at the end of the fastener than it is elsewhere along the length of the fastener. Only limited movement of the fastener by applying a force F to the tab 70 is required to move the distal edge 82 beyond the rail flange 44 as shown in FIG. 9. Once this is accomplished, the remainder of the fastener will peel from the rail as shown in FIG. 10 by continued lifting of the fastener from the rail along the length of the rail.

Figure 11:
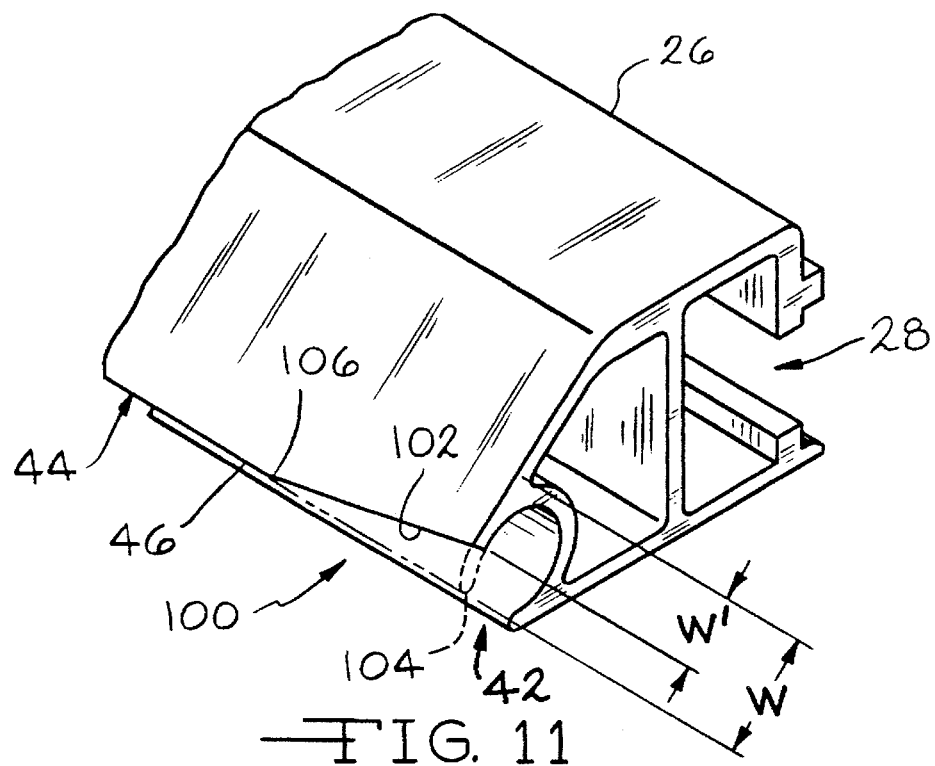
FIGS. 11 and 12 are perspective views of a frame rail having a tapered end portion.
Figure 12:
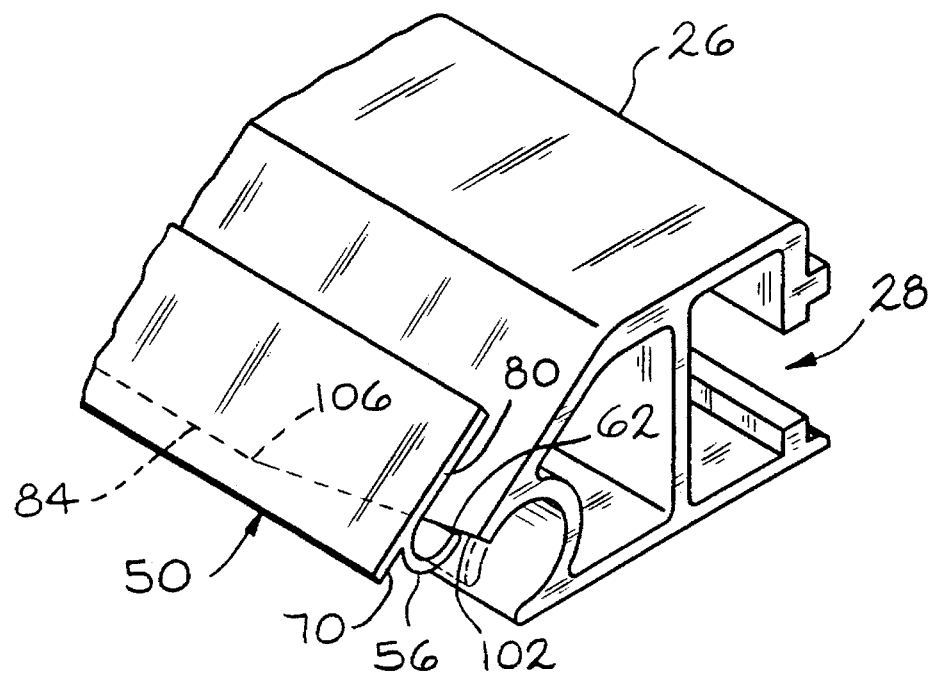

Thus far, the inventive concept of providing an improved release has been accomplished by tapering the hook portion of the fastener at the fastener end. However, the same result can be achieved by tapering the rail flange instead of tapering the fastener. With reference to FIG. 11, an end of the rail 26 is shown. Over a short end portion 100, the flange 44 is tapered by a taper 102. The taper 102 is formed by removing a corner portion 104 of the rail flange shown in broken line. The taper 102 reduces the width of the flange from its nominal width W to a reduced width W'. As a result of the taper 102, the line of contact 84 between the fastener and the rail flange does not extend to the end 80 of the fastener, but will instead end at the point 106 where the taper 102 begins. Because of the taper, the terminal edge of the flange is gradually recessed away from the concave inner surface of the hook portion.

To remove the fastener, the end of the fastener is raised by pulling up on the tab 70. Due to the taper in the rail flange, the distal edge of the fastener hook, at the end 80 of the fastener, will clear the tapered terminal edge of the rail flange. As a result, less or no flexing of the fastener hook is required to initially remove the fastener. After which, the fastener will easily peel away from the rail.

The present invention eases the removal of the tonneau cover fabric from the rail flange by providing a tapered end portion either to the rail or the fastener. This reduces the flexing of the fastener and the amount of relative movement between the fastener and the rail required to initially remove the fastener from the rail flange. This reduces the force required for initiating the removal of the fastener.

It is to be understood that the invention is not limited to the exact construction illustrated and described above, but that various changes and modifications may be made without departing from the spirit and scope of the invention as defined in the following claims.

I claim:

1. A tonneau cover for covering an area of a vehicle, said vehicle area being bounded by spaced sidewalls each having a top surface, said tonneau cover comprising:

a flexible fabric cover having side edges and a central region bounded by said side edges, said side edges being positionable above the vehicle spaced sidewalls so that said cover can extend over the vehicle area to be covered;

a frame having a plurality of elongated rails each having two ends, one of said rails being mounted on the top surface of each vehicle sidewall, at least one of said rails having a flange extending generally away from the vehicle area to a terminal edge, said flange extending a nominal width W;

an elongated fastener having two ends and being attached to said flexible cover along one of said side edges, said fastener having a base attached to said flexible fabric cover and a hook projecting from said base, said hook being formed by a return bend portion extending from said base generally away from said flexible fabric cover and then turning generally toward said central region of said cover forming a bight with a concave inner surface and ending in a distal edge spaced from said fastener base, said return bend portion having a nominal length measured from said base to said distal edge, said fastener being mounted to said frame by placing said bight around said rail flange with said terminal edge of said rail flange being seated in said bight and contacting said concave inner surface along a line of contact spaced from the distal edge of said return bend portion;

said fastener being flexible to enable said return bend portion to be removed from said rail flange by flexing of said fastener to move said line of contact between said rail and said bight toward and past said distal edge of said fastener to remove said cover from said rail; and one of said return bend portion of said fastener and said flange of said rail being tapered over an end portion of short length adjacent to one end of said fastener and said rail to enable said distal end of said return bend portion to be moved off said rail flange at said one end with reduced relative movement between said fastener and said rail.

2. The tonneau cover of claim 1 wherein said one of said return bend portion of said fastener and said flange of said rail taper along a straight line toward said one end.

3. A tonneau cover for covering the cargo area of a vehicle, said cargo area being bounded by spaced sidewalls each having a top surface, said tonneau cover comprising:

a flexible fabric cover having side edges and a central region bounded by said side edges, said side edges being positionable above the vehicle sidewalls so that the cover can extend over the vehicle cargo area;

a frame, including an elongated rail mounted on the top surface of each vehicle sidewall, at least one of said rails having a flange extending generally away from said cargo area to a terminal edge;

an elongated fastener having ends attached to said flexible cover along one of said side edges, said fastener having a base attached to said flexible cover and a hook projecting from said base, said hook being formed by a return bend portion extending from said base generally away from said flexible cover and then turning generally toward said central region of said cover forming a bight with a concave inner surface and ending in a distal edge spaced from said fastener base, said hook having a nominal length measured from said base to said distal edge, said fastener being mounted to said frame by placing said bight around said rail flange with said terminal edge of said rail flange being seated in said bight and contacting said concave inner surface along a line of contact spaced from the distal edge of the hook;

said fastener having an end portion of a short length adjacent one of said fastener ends over which said return bend portion tapers toward said one end to reduce the length of said hook as measured from said base to said distal edge at said one end of said fastener.

4. The tonneau cover of claim 3 wherein said fastener tapers along a substantially straight line toward said one end.

5. The tonneau cover of claim 3 wherein said fastener tapers along a curved line toward said one end.

6. The tonneau cover of claim 3 wherein said fastener taper is formed by rounding a corner between said return bend portion distal edge and said one end at said one end.

7. The tonneau cover of claim 3 wherein said return bend portion is tapered to reduce said length of said hook to zero at said one end of said fastener whereby at send one end, there is no return bend portion extending from said base.

8. The tonneau cover of claim 3 wherein said fastener tapers along a curved line toward said one end, said curved line being substantially normal to said distal edge and gradually curving about an arc of approximately ninety degrees to be substantially normal to said one end at said one end.

9. A tonneau cover for covering the cargo area of a vehicle, said cargo area being bounded by spaced sidewalls each having a top surface, said tonneau cover comprising:

a flexible fabric cover having side edges and a central region bounded by said side edges, said side edges being positionable above the vehicle spaced sidewalls so that the cover can extend over the vehicle cargo area;

a frame, including an elongated rail having two ends mounted on the top surface of each vehicle sidewall, one of said rails having a flange extending generally away from said cargo area to a terminal edge;

an elongated fastener having ends attached to said flexible cover along one of said side edges, said fastener having a base attached to said flexible fabric cover and a hook projecting from said base, said hook being formed by a return bend portion extending from said base generally away from said flexible cover and then turning generally toward said central region of said cover forming a bight with a concave inner surface and ending in a distal edge spaced from said fastener base, said fastener being mounted to said frame by placing said bight around said rail flange with said terminal edge of said rail flange being seated in said bight and contacting said concave inner surface along a line of contact spaced from the distal edge of the fastener; and said one rail having an end portion of a short length adjacent to one of said rail ends in which said flange tapers toward said one rail end to reduce the width of said flange to said terminal edge at said one end of said rail.

10. The tonneau cover of claim 9 wherein said flange of said rail tapers along a substantially straight line toward said one end.

* * * * *

UNITED STATES PATENT AND TRADEMARK OFFICE
CERTIFICATE OF CORRECTION

PATENT NO. : 5,487,585
DATED : January 30, 1996
INVENTOR(S) : Donald G. Wheatley It is certified that error appears in the above-indentified patent and that said Letters Patent is hereby corrected as shown below:

In the Abstract, line 9, delete "passed" and insert —past—
In the Abstract, line 10, delete "peals" and insert —peels—
Column 6, line 20, claim 7, delete "send" and insert —said—

Signed and Sealed this

Third Day of September, 1996

Attest:

BRUCE LEHMAN

Attesting Officer

Commissioner of Patents and Trademarks